(12) United States Patent
Yuan et al.

(10) Patent No.: US 11,084,748 B2
(45) Date of Patent: Aug. 10, 2021

(54) DUAL-AIRFLOW CYCLONE FLASH DRYING DEVICE

(71) Applicant: HUBEI GREEN DEVELOPMENT TECHNOLOGY CO., LTD., Hubei (CN)

(72) Inventors: Pengfei Yuan, Hubei (CN); Weiquan Wu, Hubei (CN); Caifeng Ma, Hubei (CN); Taohong Zhou, Hubei (CN)

(73) Assignee: HUBEI GREEN DEVELOPMENT TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/716,754

(22) Filed: Dec. 17, 2019

(65) Prior Publication Data
US 2020/0247702 A1 Aug. 6, 2020

(30) Foreign Application Priority Data
Dec. 31, 2018 (CN) .......................... 201822274726.0

(51) Int. Cl.
*C02F 11/00* (2006.01)
*C02F 1/06* (2006.01)
(Continued)

(52) U.S. Cl.
CPC ............ *C02F 11/121* (2013.01); *B01D 45/16* (2013.01); *B01D 46/02* (2013.01); *B04C 5/02* (2013.01);
(Continued)

(58) Field of Classification Search
CPC .......... C02F 11/121; C02F 1/06; B01D 45/16; B01D 46/02; B04C 5/02; B04C 5/103; B04C 5/14; B04C 9/00; F26B 21/003
See application file for complete search history.

(56) References Cited

U.S. PATENT DOCUMENTS

| 2,461,584 A | * | 2/1949 | Brix | ..................... B07B 4/025 |
| | | | | 209/139.1 |
| 3,263,338 A | * | 8/1966 | Gordon | ................. F26B 17/103 |
| | | | | 34/591 |

(Continued)

FOREIGN PATENT DOCUMENTS

| GB | 919631 A | * | 2/1963 | ............ F26B 17/101 |
| KR | 100485223 B1 | * | 4/2005 | .............. C02F 11/12 |

OTHER PUBLICATIONS

IP.com machine translation of KR-100485223-B1 obtained Feb. 4, 2021. (Year: 2021).*

*Primary Examiner* — Jonathan Miller
(74) *Attorney, Agent, or Firm* — Tim Tingkang Xia, Esq.; Locke Lord LLP

(57) ABSTRACT

A dual-airflow cyclone flash drying device includes a feeding device, a fluidizing cyclone generator and a drying cylinder. The fluidizing cyclone generator is connected with the drying cylinder through a central connecting pipe. The tail end of the feeding device is provided with a porous plate doser that is connected with the central connecting pipe. The fluidizing cyclone generator adopts lateral air supply, air forms a cyclone along the circular outer wall to enter the central connecting pipe. A drying cyclone generator is arranged at the lower portion of the drying cylinder. The drying cyclone generator adopts lateral air supply, and after forming a cyclone, air spirally rises to make contact with fluidized granular sludge to evaporate sludge moisture into water vapor. A particle size selector is arranged at the upper portion of the drying cylinder, and an outlet flue is arranged above the particle size selector.

7 Claims, 2 Drawing Sheets

(51) Int. Cl.

| | |
|---|---|
| *C02F 11/121* | (2019.01) |
| *B01D 45/16* | (2006.01) |
| *B01D 46/02* | (2006.01) |
| *B04C 9/00* | (2006.01) |
| *B04C 5/103* | (2006.01) |
| *B04C 5/14* | (2006.01) |
| *F26B 21/00* | (2006.01) |
| *B04C 5/02* | (2006.01) |

(52) U.S. Cl.
CPC ............... *B04C 5/103* (2013.01); *B04C 5/14* (2013.01); *B04C 9/00* (2013.01); *C02F 1/06* (2013.01); *F26B 21/003* (2013.01); *B04C 2009/002* (2013.01)

(56) References Cited

U.S. PATENT DOCUMENTS

| | | | | |
|---|---|---|---|---|
| 3,414,980 | A | * | 12/1968 | Nezbed ................... B01D 1/18 34/339 |
| 4,002,524 | A | * | 1/1977 | Damgaard-Iversen ...................... B01D 1/14 159/4.01 |
| 4,191,643 | A | * | 3/1980 | Kneer ................... C02F 11/125 210/609 |
| 5,426,866 | A | * | 6/1995 | Rumocki ............... B04B 15/12 34/321 |
| 2016/0367936 | A1 | * | 12/2016 | Ukai ....................... B01D 1/20 |

* cited by examiner

DUAL-AIRFLOW CYCLONE FLASH DRYING DEVICE

CROSS-REFERENCE TO RELATED APPLICATION

This application claims priority to Chinese Patent Application No. 201822274726.0, filed Dec. 31, 2018 in the State Intellectual Property Office of P.R. China, which is hereby incorporated herein in its entirety by reference.

TECHNICAL FIELD

The disclosure relates to the fields of chemical engineering and environmental protection, in particular to a dual-airflow cyclone flash drying device.

BACKGROUND

Urban organic solid wastes, especially sludge, have high water content, tend to rot to produce strong odor, and contain a large number of pathogenic bacteria and parasite eggs, heavy metals such as chromium and mercury, and toxic, harmful and carcinogenic substances that are difficult to degrade. Sludge that is stacked at random without treatment tends to cause secondary pollution to groundwater, soil, etc. after erosion by rainwater and the percolation effect, which directly endangers human health.

With the increasingly high requirement of the government for urban sanitation environment, sludge disposal has become an important issue of increasing concern to the environment. In order to realize the final disposal of sludge, the combination of sludge drying and incineration is the best solution, which can not only realize sludge reduction and hazard-free treatment, but also realize the recycling of sludge disposal. Drying treatment is usually required before incineration of urban dewatered sludge. Biochemical sludge from urban sewage plants has high organic component content, and has a high heat value after drying, thus can be used as inferior fuel for incineration, so as to realize the final disposal and recycling of sludge.

At present, sludge drying process equipment widely used in China includes rotary drying process equipment, belt drying process equipment, paddle drying process equipment, horizontal rotary plate drying process equipment and the like. Rotary drying equipment and belt drying equipment usually adopt contact drying, while paddle drying equipment and disc drying equipment usually adopt non-contact indirect drying. The rotary drying equipment has characteristics of large floor area, long contact time and low drying efficiency; while belt dryers have characteristics of limited drying capacity of a single drying machine, inability to realize complete sealing and poor workshop environment; and indirect drying equipment also occupies a large area and requires a primary or secondary high-quality heat source for drying, thus the drying cost is high. These devices all have obvious advantages and disadvantages.

Flash dryers can utilize waste heat such as industrial boiler tail gas and power plant flue gas, thus having the advantage of low energy consumption. However, traditional rotary flash dryers use mechanical scattering devices, which have the disadvantages of severe equipment wear when directly used for sludge drying, and frequent equipment failures and large maintenance amount under severe working conditions such as high dust content.

SUMMARY

The technical problem to be solved by the disclosure is to provide a dual-airflow cyclone flash drying device, which greatly reduces the failure rate of equipment, improves the sludge efficiency, and retains the extremely high thermal efficiency of a cyclone flash drying machine.

The technical solution adopted by the disclosure for solving the technical problem is as follows: a dual-airflow cyclone flash drying device is constructed, which comprises a feeding device, a fluidizing cyclone generator and a drying cylinder; the fluidizing cyclone generator is connected with the drying cylinder through a central connecting pipe;

The tail end of the feeding device is provided with a porous plate doser, and the porous plate doser is connected with the central connecting pipe; the fluidizing cyclone generator adopts lateral air supply, air forms a cyclone along the circular outer wall to enter the central connecting pipe, the high-speed cyclone shears and breaks the sludge entering the central connecting pipe into granules, and the granules are brought into the drying cylinder at the upper portion along with the cyclone; a drying cyclone generator is arranged at the lower portion of the drying cylinder, the drying cyclone generator adopts lateral air supply, and after forming a cyclone, air spirally rises to make contact with fluidized granular sludge to evaporate sludge moisture into water vapor; and a particle size selector is arranged at the upper portion of the drying cylinder, and an outlet flue is arranged above the particle size selector.

In the above solution, the feeding device comprises a screw conveyor barrel, a motor, a speed reducer and a variable pitch screw, the variable pitch screw is arranged inside the screw conveyor barrel, the variable pitch screw is connected with the motor and the speed reducer, and the screw conveyor barrel is provided with a feeding port.

In the above solution, the fluidizing cyclone generator comprises a housing, a lateral air inlet is formed in the housing, and a star-shaped discharger is arranged at the bottom of the housing.

In the above solution, the central connecting pipe is provided with a section regulator.

In the above solution, the inner center of the drying cylinder is provided with a conical guide plate.

In the above solution, a ceramic lining layer is adopted in a cylinder body of the drying cylinder.

In the above solution, the outlet flue is connected with a gas-solid separator, and the gas-solid separator is a cyclone separator or a bag separator.

The dual-airflow cyclone flash drying device has the following beneficial effects:

1. The disclosure adopts airflow atomization and sludge fluidization, the dual-airflow cyclone flash drying device utilizes the advantages of a traditional cyclone flash dryer, high-speed flue gas airflow is adopted to atomize and fluidize the sludge, and a traditional mechanical scattering device is replaced, thus greatly reducing the failure rate of equipment, improving the sludge efficiency, and retaining the extremely high thermal efficiency of the cyclone flash drying machine.

2. The disclosure adopts a high-speed cyclone fluidizer, which solves the problem that the traditional mechanical breaking and scattering device needs to be equipped with motor speed reducer rotating equipment, which is prone to breakdown; besides, gas fluidization has better adjustment allowance and can adapt to the breaking of materials with different water contents.

3. The disclosure adopts the cyclone fluidization and atomization technology, which can atomize sludge into fine particles, thus increasing the surface area by hundreds of times, increasing the heat exchange area, improving the heat exchange efficiency, and improving the drying intensity.

4. The tower-type vertical arrangement is adopted in the disclosure, thus greatly reducing the occupied area, and compared with horizontal equipment, the occupied area is reduced by 50% or above.

5. The disclosure adopts waste gas for drying, thus reducing the sludge treatment cost, and the direct energy cost can be reduced by 30%-50%.

BRIEF DESCRIPTION OF THE DRAWINGS

The present disclosure will be further described with reference to the accompanying drawings and embodiments, and in the embodiments.

DETAILED DESCRIPTION OF THE EMBODIMENTS

In order to have a clearer understanding of the technical features, objectives and effects of the present disclosure, detailed description of the embodiments of the present disclosure will now be provided with reference to the accompanying drawings.

Figure 1:
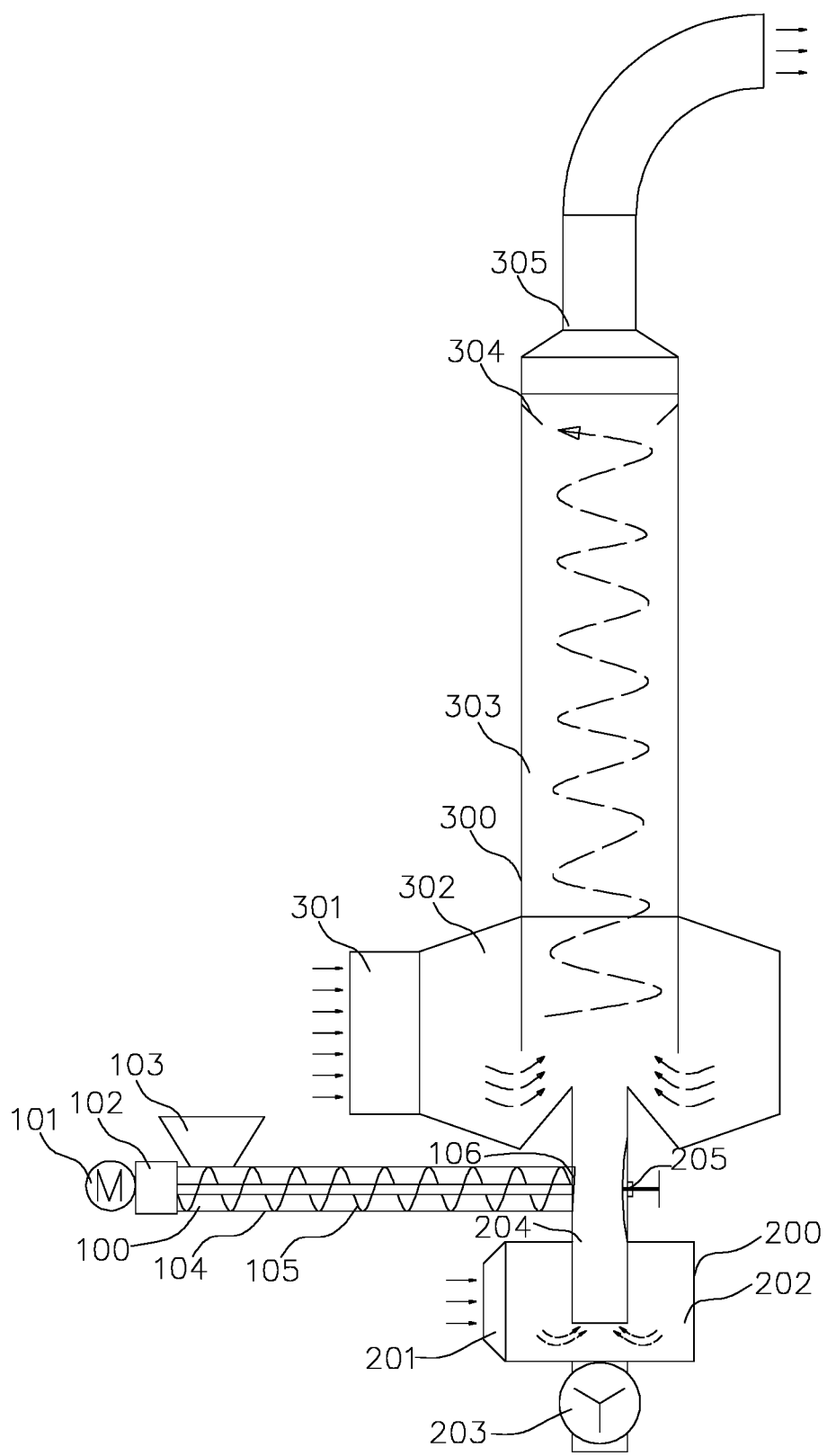
FIG. 1 is a structural diagram of a dual-airflow cyclone flash drying device of the present disclosure.
Figure 2:
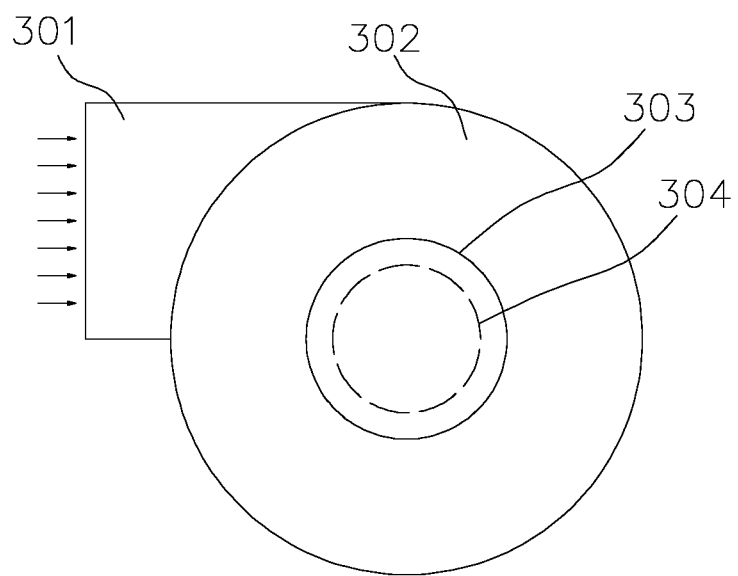
FIG. 2 is a top view of a drying cylinder.

As shown in FIGS. 1-2, a dual-airflow cyclone flash drying device of the disclosure comprises a feeding device 100, a fluidizing cyclone generator 200 and a drying cylinder 300, and the fluidizing cyclone generator 200 is connected with the drying cylinder 300 through a central connecting pipe 204.

The tail end of the feeding device 100 is provided with a porous plate doser 106, the porous plate doser 106 is connected with the central connecting pipe 204, and the porous plate doser 106 pre-extrudes and breaks the sludge, making sludge blocks become 5-10 mm sludge strips through extrusion after passing through the porous plate doser 106, which is beneficial to fluidization and crushing of the sludge. The fluidizing cyclone generator 200 is connected with an external fluidization fan and adopts lateral air supply, air forms a cyclone along the circular outer wall to enter the central connecting pipe 204, the high-speed cyclone shears and breaks the sludge entering the central connecting pipe 204 into granules, and the granules are brought into the drying cylinder 300 at the upper portion along with the cyclone; a drying cyclone generator 302 is arranged at the lower portion of the drying cylinder 300, the drying cyclone generator 302 adopts lateral air supply, too, and after forming a cyclone, air spirally rises to make contact with fluidized granular sludge for heat exchange and mass transfer, instantly evaporating sludge moisture into water vapor; and a particle size selector 304 is arranged at the upper portion of the drying cylinder 300, which is used for controlling the dryness and particle size of the sludge, and dry sludge particles with particle sizes within a certain range are entrained by the cyclone to enter a subsequent gas-solid separator connected with the drying device. An outlet flue 305 is arranged above the particle size selector.

Further, the feeding device 100 comprises a screw conveyor barrel 104, a motor 101, a speed reducer 102 and a variable pitch screw 105, and the variable pitch screw 105 is arranged inside the screw conveyor barrel 104 and has an extrusion function. The variable pitch screw 105 is connected with the motor 101 and the speed reducer 102, and the screw conveyor barrel 104 is provided with a feeding port 103.

Further, the fluidizing cyclone generator 200 adopts a T-shaped structure and comprises a housing 202, a lateral air inlet 201 is formed in the housing 202, and a star-shaped discharger 203 is arranged at the bottom of the housing 202. The middle of the housing 202 is provided with a central connecting pipe 204, the outer circle is provided with a cylindrical lateral air inlet barrel, and the central connecting pipe 204 adopts a design non-concentric with the cylindrical shape on the outer circle, so as to increase the cyclone shearing effect and facilitate the breaking of materials.

Further, a section regulator 205 is arranged in the central connecting pipe 204, the section regulator 205 is a variable section negative diaphragm, and the sectional area of the central pipe can be manually adjusted to change the fluidization air speed and improve the shearing efficiency.

Further, the inner center of the drying cylinder 300 is provided with a conical guide plate, and the conical center is provided with the central connecting pipe 204. The conical surface is provided with rotating blades which rotate under the action of the cyclone to be used for breaking blocky or large granular sludge.

Further, a ceramic lining layer is adopted in a cylinder body 303 of the drying cylinder 300, which can be used for heat preservation and abrasion prevention to keep the surface smooth, and an annular plate classifier is arranged at the upper portion of the drying cylinder 300 as the particle size selector 304, which can control the discharge particle size on one hand and separate undried materials for continuous drying on the other hand.

Further, the upper portion of the drying cylinder 300 is connected with the outlet flue 305 after being reduced, the outlet flue 305 is connected with a gas-solid separator, and the gas-solid separator is a cyclone separator or a bag separator, or a combination of the two.

The working principle of the disclosure is as follows:

Organic solid wastes such as sludge enter the feeding screw through the feeding port 103 of the feeding device 100, are conveyed through the feeding device 100 and extruded into 5-10 mm sludge strips through the porous plate doser 106, and then enter the central pipe 204; high-speed hot air entering through the lateral air inlet 201 of the fluidizer 200 forms a cyclone in the fluidizer 200, the cyclone enters the central pipe 204 and collides with the sludge strips, and the sludge strips are sheared and broken by the high-speed cyclone airflow and then enter the drying cylinder 300; a large amount of hot flue gas enters the cyclone generator 302 of the drying cylinder 300 through a lateral air inlet 301 of the drying cylinder 300 to form a high-speed cyclone, and the high-speed cyclone enters the drying cylinder 300 through an annular gap formed by a lower extending part of the drying cylinder 300 and the cyclone generator 302, and makes contact with the sludge entering the central connecting pipe to realize heat exchange and mass transfer; the sludge rotates and rises in the drying cylinder 300, due to the centrifugal force, the sludge with larger particle sizes is rotated by the cyclone to approach the outer side of the cylinder and rises to a certain height, the sludge intercepted by the particle size selector descends under the action of gravity and collides with the rising particles, breaking and heat exchange are continued to be conducted, and the sludge with smaller particle sizes is carried in the cyclone center to enter the gas-solid separator at the lower level from the outlet flue 305 at the upper portion of the drying cylinder 300.

What is not mentioned above is applicable to the prior art.

The embodiments of the present disclosure have been described above with reference to the accompanying drawings, but the present disclosure is not limited to the above-mentioned specific embodiments. The above-mentioned specific embodiments are merely illustrative and not restrictive. Under the inspiration of the present disclosure, one of ordinary skill in the art can also make many forms without departing from the purpose of the present disclosure and the scope protected by the claims, all of which are within the protection of the present disclosure.

What is claimed is:

1. A dual-airflow cyclone flash drying device, comprising:
a feeding device, a fluidizing cyclone generator and a drying cylinder;
wherein the fluidizing cyclone generator is connected with the drying cylinder through a central connecting pipe;
wherein a tail end of the feeding device is provided with a porous plate doser, wherein the porous plate doser is connected with the central connecting pipe;
wherein the fluidizing cyclone generator comprises a housing with a lateral air inlet for supplying air, wherein in operation, air supplied from the lateral air inlet in the housing forms a cyclone to enter the central connecting pipe from a bottom of the central connecting pipe, the cyclone shears and breaks sludge entering the central connecting pipe into granules, and the granules are brought into the drying cylinder at a top of the central connecting pipe along with the cyclone;
wherein a drying cyclone generator is arranged at a lower portion of the drying cylinder, and comprises a lateral drying air inlet for supplying drying air, wherein in operation, drying air supplied from the lateral drying air inlet forms a drying air cyclone in the drying cyclone generator, said drying air spirally rises to make contact with the granules to evaporate moisture of the granules into water vapor; and
wherein a particle size selector is arranged at an upper portion of the drying cylinder, and an outlet flue is arranged above the particle size selector.

2. The dual-airflow cyclone flash drying device according to claim 1, wherein the feeding device comprises a screw conveyor barrel, a motor, a speed reducer and a variable pitch screw,
wherein the variable pitch screw is arranged inside the screw conveyor barrel and connected with the motor and the speed reducer, and
wherein the screw conveyor barrel is provided with a feeding port.

3. The dual-airflow cyclone flash drying device according to claim 1, wherein the fluidizing cyclone generator further comprises a star-shaped discharger is arranged at a bottom of the housing.

4. The dual-airflow cyclone flash drying device according to claim 1, wherein the central connecting pipe is provided with a section regulator.

5. The dual-airflow cyclone flash drying device according to claim 1, wherein a center of the drying cylinder is provided with a conical guide plate.

6. The dual-airflow cyclone flash drying device according to claim 1, wherein a ceramic lining layer is provided in a cylinder body of the drying cylinder.

7. The dual-airflow cyclone flash drying device according to claim 1, wherein the outlet flue is connected with a gas-solid separator, and wherein the gas-solid separator is a cyclone separator or a bag separator.

* * * * *